J. C. LINDSEY.
LAWN EDGER.
APPLICATION FILED MAR. 16, 1911.
1,000,028.
Patented Aug. 8, 1911.
2 SHEETS—SHEET 1.
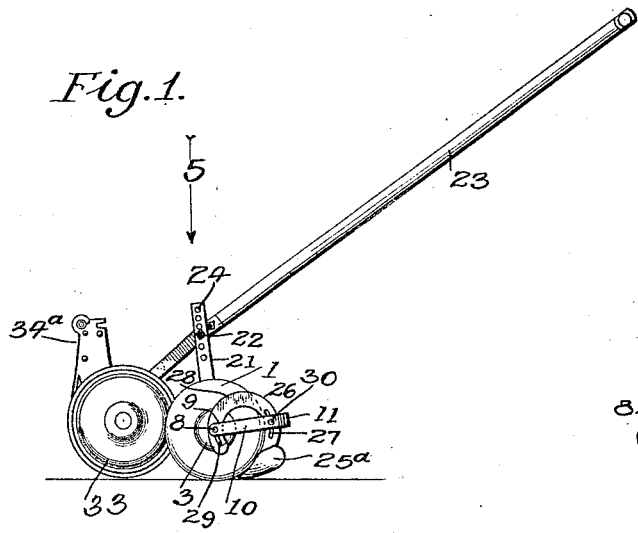
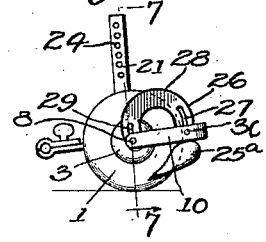
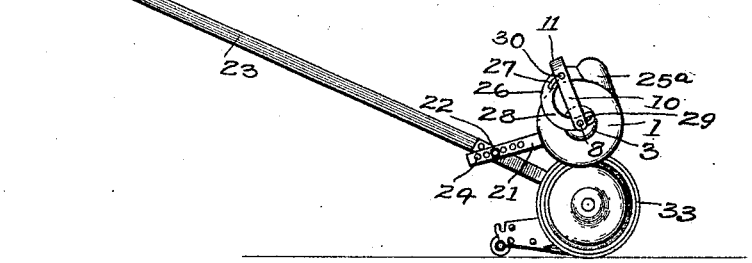
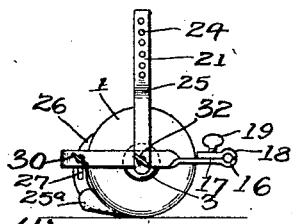
Witnesses:
Inventor,
John C. Lindsey,
by Wells & Williams
Attorneys.

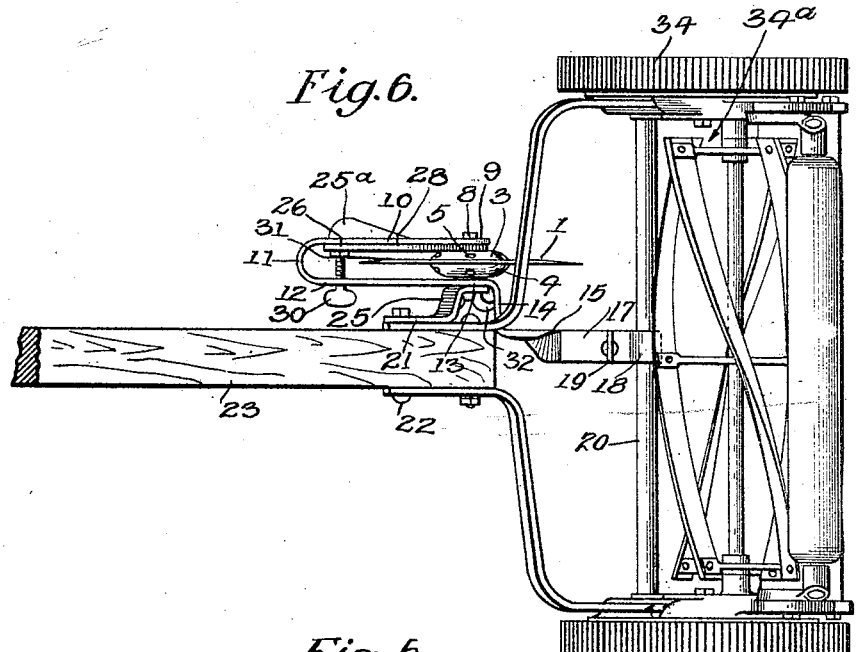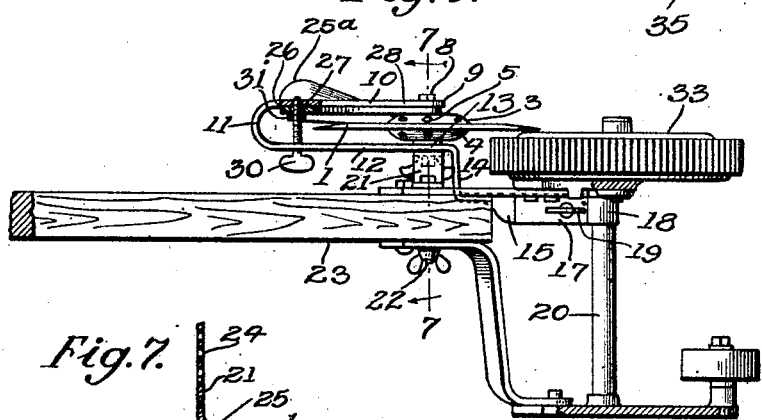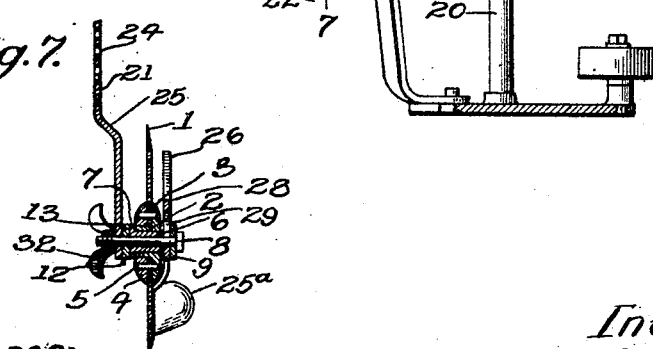

UNITED STATES PATENT OFFICE.

JOHN C. LINDSEY, OF LOS ANGELES, CALIFORNIA.

LAWN-EDGER.

1,000,028.  Specification of Letters Patent. Patented Aug. 8, 1911.

Application filed March 16, 1911. Serial No. 614,869.

*To all whom it may concern:*

Be it known that I, JOHN C. LINDSEY, a citizen of the United States, residing at Los Angeles, in the county of Los Angeles and State of California, have invented a new and useful Lawn-Edger, of which the following is a specification.

My object is to make a lawn edger which may be used as an attachment for a lawn trimmer or a lawn mower, and my invention consists of the novel features herein shown, described and claimed.

In the drawings: Figure 1 is a side elevation showing my lawn edger applied to a lawn trimmer and in position for use as required to trim the edge of the lawn and make a gutter. Fig. 2 is a view analogous to Fig. 1; the lawn trimmer being omitted and the plow being adjusted to serve as a gage as required to trim the edge of the lawn without making a gutter. Fig. 3 is a view analogous to Fig. 1; the lawn trimmer being bottom upward in Fig. 1 and right side up in Fig. 3; and the lawn edger being out of use in Fig. 3. Fig. 4 shows the opposite side of the lawn edger from Fig. 2. Fig. 5 is an enlarged fragmentary plan of the lawn edger applied to the lawn trimmer as seen looking in the direction of the arrow 5 in Fig. 1, parts of the lawn trimmer being omitted. Fig. 6 is a view analogous to Fig. 5 showing the lawn edger applied to a lawn mower. Fig. 7 is an enlarged sectional detail on the line 7—7, of Fig. 2, and looking in the direction indicated by the arrow.

Referring to the drawings in detail, the cutting disk or rolling colter 1 has a central opening to receive the bushing 2, and the flange 3 extends from one end of the bushing and fits against one face of the disk, the flange 4 fits around the other end of the bushing against the other face of the disk 1 and rivets 5 inserted through the flanges and through the disk complete the hub of the rolling colter.

The axle bushing 6 fits loosely in the hub bushing 2 and is slightly longer. A flange or head 7 is formed on one end of the axle bushing 6 and the bolt 8 fits in the axle bushing 6 and serves as an axle. A plow beam is mounted upon the axle 8; said plow beam being formed of strap iron and comprising the bearing 9, the bar 10 extending backwardly from the bearing 9, the return bend 11 extending from the rear end of the bar 10, the bar 12 extending from the return bend parallel with the bar 10, the bearing 13 in the bar 12 in alinement with the bearing 9, said axle bolt 8 extending through the bearings 9 and 13, the off-set portion 14 extending from the end of the bar 12 substantially at right angles, the clamping bar 15 extending from the off-set portion 14, the half bearing 16 on the end of the clamping bar, the loose clamping bar 17 fitting the clamping bar 15 and having the half bearing 18 matching the half bearing 16, and the clamping screw 19 inserted through the clamping bar 17 and screw seated in the clamping bar 15. The half bearings 16 and 18 embrace the frame bar 20 of the lawn trimmer, or lawn mower, so as to connect the plow beam either to the lawn trimmer or the lawn mower.

The brace or link 21 connects the axle bolt 8 to the bolt 22; said bolt 22 being one of the bolts which holds the handle 23 of the machine in place. A series of openings 24 is formed through the brace 21 for adjustment and a bend 25 is formed in the central part of the brace so as to off-set the rolling colter relative to the handle 23.

A plow is adjustably mounted relative to the plow beam and the rolling colter, and said plow comprises the plow share and mold-board 25ª, the shank portion 26 extending upwardly from the plow share and having a slightly curved slot 27, the return bend portion 28 extending forwardly from the portion 26 and having a curved slot 29 in its end; said slots 27 and 29 being arcs of a circle, and the axle bolt 8 extending through the slot 29. The adjusting screw 30 extends through the bar 12 and through the slot 27 and is screw seated in the bar 10, a nut 31 is mounted upon the adjusting screw against the shank 26 so that by manipulating the adjusting screw 30 and the nut 31 the shank 26 is clamped to the bar 10. The clamping nut 32 is mounted upon the axle bolt 8 against the brace 21, so that by manipulating the nut 32 and the clamping screw 30 the position of the plow 25ª may be adjusted relative to the plow beam.

When the nut 32 is tightened the pressure is exerted against the axle bushing and leaves the rolling colter free to run upon the axle bushing.

When the lawn edger thus constructed is applied to the ordinary lawn trimmer having one driving wheel 33, as in Figs. 1, 3 and 5, the rolling colter is in a plane just outside of the driving wheel 33, and when the lawn edger is in use, as in Fig. 1, the mower mechanism 34 is bottom upward and when the mower mechanism 34ª is in use as in Fig. 3, the lawn edger mechanism is out of use. When the lawn edger is applied to a lawn mower, as in Fig. 6, it is in a plane between the two driving wheels 34 and 35 of the lawn mower, and when the mower is right side up for cutting grass the edger is up in the air, and when the edger is down in use the mowing mechanism is up in the air.

The lawn edger may be applied to any of the usual forms of lawn mowers or lawn trimmers and the details of these machines need not be described.

I claim:—

A lawn edger attachment for lawn mowers and the like comprising a plow beam, a clamp on the forward end of the plow beam for attachment to the lawn mower or the like, adjustable means for attaching the plow beam to the handle of the lawn mower or the like, a rolling colter mounted on the plow beam, and a plow adjustably mounted on the plow beam beside the rolling colter.

JOHN C. LINDSEY.

Witnesses:
C. H. GULLIFORD,
HERBERT STEAD GULLIFORD.